UNITED STATES PATENT OFFICE.

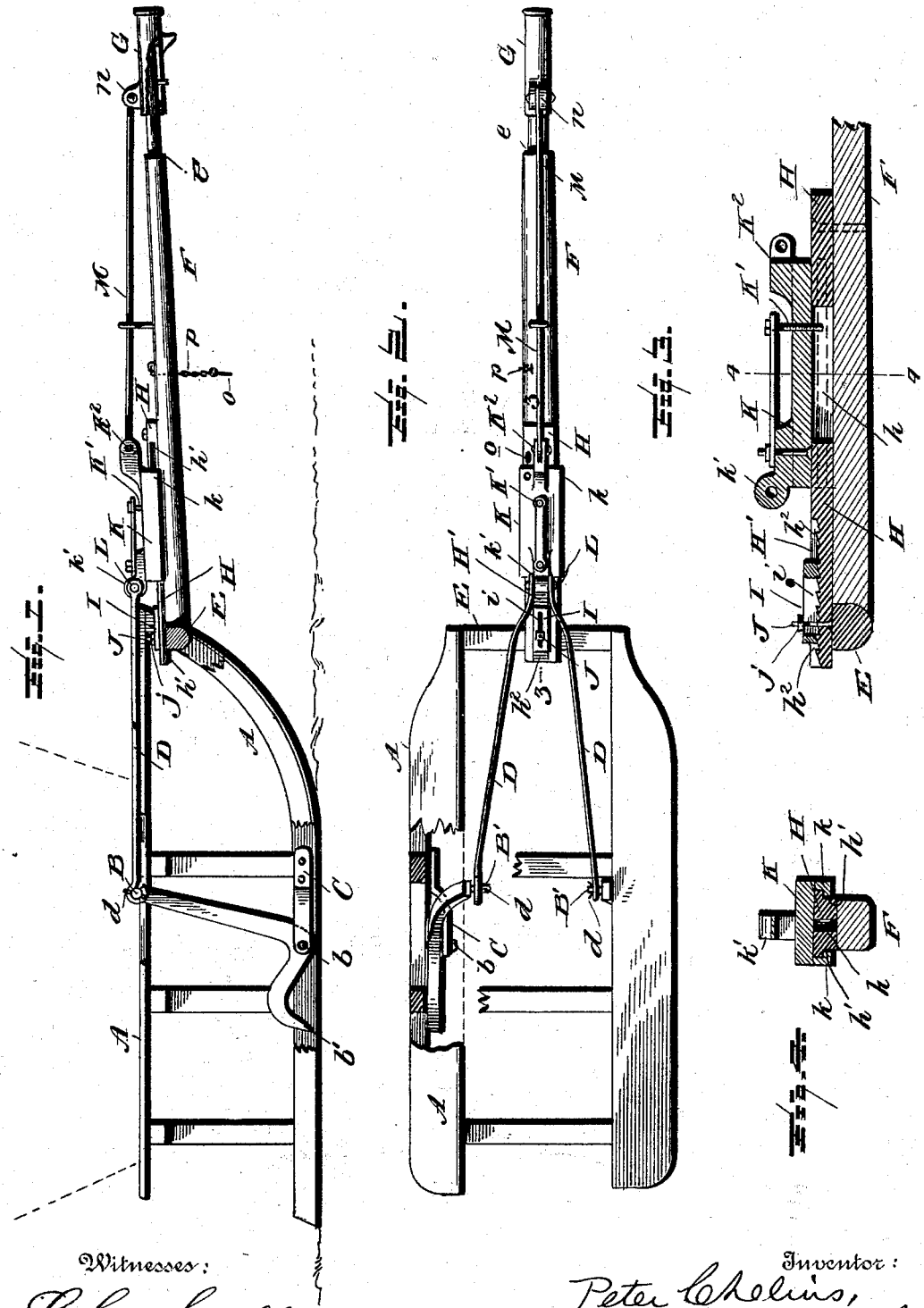

PETER CHELIUS, OF TROUT CREEK, NEW YORK.

SLED-BRAKE.

SPECIFICATION forming part of Letters Patent No. 505,391, dated September 19, 1893.

Application filed June 12, 1893. Serial No. 477,304. (No model.)

*To all whom it may concern:*

Be it known that I, PETER CHELIUS, a citizen of the United States, residing at Trout Creek, in the county of Delaware and State of New York, have invented certain new and useful Improvements in Sled-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in sleds and more particularly to the brakes therefor, and it has for its objects among others to provide a simple and cheap construction whereby the brake may be automatically applied or held against application as may be desired.

I provide a sliding connection between the brakes and the draft appliances, which connection is of peculiar and simple construction and which constitutes the novel feature of the present invention.

Other objects and advantages of the invention will hereinafter appear and the novel features thereof will be specifically defined by the appended claims.

The invention in the present instance resides in the peculiar combinations, and the construction, arrangement and adaptation of parts, all as more fully hereinafter described, shown in the drawings and then particularly pointed out in the claims.

The invention is clearly illustrated in the accompanying drawings, which, with the letters of reference marked thereon, form a part of this specification, and in which—

Figure 1 is a side elevation of a sled provided with my improvements, with parts broken away. Fig. 2 is a plan view of the same. Fig. 3, is an enlarged section on line 3, 3, of Fig. 2, and Fig. 4 is a cross-section on line 4—4 of Fig. 3.

Like letters of reference indicate like parts in all the views.

Referring now to the details of the drawings by letter, A designates the sled which, except as hereinafter specified, may be of any well known or preferred form of construction.

To the inner face of the runners are pivoted the brakes B the pivots $b$ of which are held in the runners and in the plates C which are secured to the runners and between which and the runners the brakes are designed to work. The brakes are each substantially L-shaped with their horizontal portions terminating in the downwardly-extending sharpened points $b'$ as shown, which are normally above the acting faces of the runners. The upper ends of the vertical arms or portions of the runners are formed with the horizontal portions B' which extend toward each other as shown and to which are connected the rear ends of the links or rods D which are detachably sleeved on the said horizontal portions B' being held against displacement by the pins $d$ as shown. The forward ends of the runners are connected by the cross bar E which is journaled to turn in suitable bearings in the runners and to the center of which is secured the pole or tongue F the forward end of which is rounded as shown and provided with a shoulder $e$ and on this rounded portion is sleeved the sleeve G.

On the rear end of the pole or tongue there is secured a plate H which has the longitudinal slot $h$ for a purpose hereinafter explained and the side undercut guides or flanges $h'$ the object of which will soon appear. The rear end of this plate is formed with a longitudinal groove H' the bottom of which is formed with teeth as shown at $h^2$ and fitted to be adjusted in this groove is a plate I the under face of which is toothed or notched to engage the teeth of the bottom of the groove, the said plate I being provided with a longitudinal slot $i$ through which passes a bolt J into the tongue or pole and which is provided with a nut $j$ and by means of which the position of this plate I may be changed as occasion may desire; this plate serves as a stop to limit the movement of the plate which slides over the plate H as will soon be described.

K is a plate fitted to slide over the plate H and it is provided with flanges $k$ which are preferably formed separate and secured thereto to engage under the guides or flanges $h'$ of the plate H as shown and this sliding plate is further provided with a downwardly-extending pin K' which works in the longitudinal slot of the plate H to guide the upper plate in its movements. The rear end of the plate K is formed with a lug or knuckle $k'$ in which is held a cross bolt L to which are pivotally held the forward ends of the links or rods D the rear ends of which are connected to the upper ends of the vertical portions of the brakes as shown. The forward end of the plate K has a lug $K^2$ which is bifurcated and in which is pivotally secured one end of a rod or arm M the other end of which is pivotally connected with a lug $n$ on the sleeve G, the said rod or arm being guided by eyes or loops or analogous device N which is held in the upper face of the pole or tongue as shown.

The operation will be readily understood from the foregoing description when taken in connection with the annexed drawings, and a further detailed description thereof is not deemed necessary. When it is desired to prevent the sliding of the plate K upon its guide plate H a pin O which is carried by a cord or chain P held to the pole or tongue is engaged in a hole in the plate K and in a hole $o$ in the forward end of the plate H to hold the plate K at its farthest limit of movement forward.

What I claim as new is—

1. The combination with the sled and the pivoted brakes, of the pivoted tongue, the sleeve thereon, the sliding plate on the tongue, the adjustable stop for said plate and the pivotal connections between said plate and the brakes and sleeve, substantially as specified.

2. The combination with the sled and the pivoted brakes, of the pivoted tongue, the sleeve thereon, the fixed plate on the tongue with slot, and the sliding plate with a pin working in said slot and connected with the brakes and sleeve, substantially as specified.

3. The combination with the sled and the pivoted brakes, of the pivoted tongue, the sleeve thereon, the plate on the tongue and having slot and guides, the adjustable toothed stop plate, the sliding plate with pin working in said slot and with guide flanges, and the pivotal connections between the sliding plate and the brakes and sleeve, substantially as specified.

In testimony whereof I affix my signature in presence of two witnesses.

PETER CHELIUS.

Witnesses:
WILLIAM H. WILSON,
CHESTER TEED.